US010006498B2

(12) United States Patent
Fliearman et al.

(10) Patent No.: US 10,006,498 B2
(45) Date of Patent: Jun. 26, 2018

(54) DRIVE ASSEMBLY WITH BIMODAL CLUTCH MODULE

(71) Applicant: Deere & Company, Moline, IL (US)

(72) Inventors: Steven R. Fliearman, Coffeyville, KS (US); Randall L. Long, Coffeyville, KS (US); William G. Detrick, Coffeyville, KS (US)

(*) Notice: Subject to any disclaimer, the term of this patent is extended or adjusted under 35 U.S.C. 154(b) by 30 days.

(21) Appl. No.: 15/009,369

(22) Filed: Jan. 28, 2016

(65) Prior Publication Data

US 2017/0219021 A1    Aug. 3, 2017

(51) Int. Cl.
| F16D 13/52 | (2006.01) |
| F16D 13/56 | (2006.01) |
| F16D 25/0638 | (2006.01) |
| F16D 65/00 | (2006.01) |
| F16D 55/40 | (2006.01) |
| F16D 121/06 | (2012.01) |

(52) U.S. Cl.
CPC ............. *F16D 13/52* (2013.01); *F16D 13/56* (2013.01); *F16D 25/0638* (2013.01); *F16D 65/00* (2013.01); *F16D 55/40* (2013.01); *F16D 2121/06* (2013.01); *F16D 2300/12* (2013.01)

(58) Field of Classification Search
CPC ...... F16D 25/0638; F16D 25/10; F16D 13/52; F16D 13/56
See application file for complete search history.

(56) References Cited

U.S. PATENT DOCUMENTS

| 1,885,516 | A |   | 11/1932 | Fast |          |
|-----------|---|---|---------|------|----------|
| 3,566,707 | A |   | 3/1971  | Schulz |        |
| 4,648,495 | A | * | 3/1987  | Vater | ............... F16D 25/0638 |
|           |   |   |         |      | 192/113.36 |
| 4,807,732 | A | * | 2/1989  | Lehle | ................ F16D 25/0638 |
|           |   |   |         |      | 192/48.5 |
| 5,226,517 | A | * | 7/1993  | Grochowski | ....... F16D 25/0638 |
|           |   |   |         |      | 192/106 F |

(Continued)

FOREIGN PATENT DOCUMENTS

| DE | 60210476 T2 | 12/2006 |
| DE | 102009038198 A1 | 3/2010 |

(Continued)

OTHER PUBLICATIONS

German Search Report for Application No. 102017201181.5 dated Mar. 14, 2018.

*Primary Examiner* — Ramya P Burgess
*Assistant Examiner* — David R Morris
(74) *Attorney, Agent, or Firm* — Lorenz & Kopf, LLP

(57) ABSTRACT

A work vehicle drive assembly has a bimodal clutch module that includes a pressure plate, a module housing containing first and second cavities located on opposing sides of the pressure plate, and an actuator. The actuator is controllable to move the pressure plate along a working axis of the clutch module. A clutch member is installed in a selected one of the first and second cavities. The clutch member is (i) engaged by movement of the pressure plate along the working axis in a first direction when the clutch member is installed in the first cavity and (ii) disengaged by movement of the pressure plate along the working axis in the first direction when the clutch member is installed in the second cavity.

20 Claims, 4 Drawing Sheets

(56) References Cited

U.S. PATENT DOCUMENTS

| | | | |
|---|---|---|---|
| 7,264,101 B2* | 9/2007 | Hauck | F16D 25/0638 192/113.36 |
| 2003/0034221 A1 | 2/2003 | Weiss et al. | |
| 2004/0060779 A1 | 4/2004 | Kreger | |
| 2006/0081423 A1 | 4/2006 | Daigre | |

FOREIGN PATENT DOCUMENTS

| | | |
|---|---|---|
| EP | 1584830 A1 | 10/2005 |
| FR | 415752 A | 5/1910 |
| FR | 459860 A | 4/1913 |
| GB | 26605 | 10/1904 |

* cited by examiner

DRIVE ASSEMBLY WITH BIMODAL CLUTCH MODULE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates generally to drive assemblies for work vehicles, and more particularly, to clutch modules that can be structurally configured to function as either spring-applied, actuator-released rotary couplings or actuator-applied, spring-released rotary couplings.

BACKGROUND OF THE DISCLOSURE

In various work vehicle applications, a drive assembly may be utilized to provide rotational power to various components of the vehicle. In some wheeled or tracked vehicles, such as motor graders, a final drive assembly is mounted to a frame of the vehicle to provide rotational power, at a wheel mount of the drive assembly, to drive the wheels or tracks of the vehicle, and thereby move the vehicle over terrain. Such a drive assembly (and others) may include hydraulic motors for providing rotational power, and various gears for adjusting the speed of the rotational power for output at the wheel mount.

Hydraulically-actuated modules containing clutch devices (hereafter "hydraulic clutch modules") are commonly incorporated into drive assemblies such as these for the purpose of providing a selective rotary coupling. The rotary coupling is "selective" in the sense that the coupling can be selectively engaged and disengaged by controlling the flow of pressurized hydraulic fluid to the clutch module during work vehicle operation. The function of a hydraulic clutch module can vary depending upon clutch module design and the manner in which the clutch module is integrated into a particular work vehicle. In certain instances, a hydraulic clutch module may be designed to function as a hydraulically-applied, spring-released rotary coupling. In this case, the hydraulic clutch module can be hydraulically controlled to connect or disconnect an input shaft to an output shaft to, for example, selectively provide a freewheel condition between one or more drive motors and the wheels of a work vehicle. In other instances, a hydraulic clutch module may be designed to function as a spring-applied, hydraulically-released brake. In this case, the hydraulic clutch module can be controlled to selectively couple an input shaft to a non-rotating structure or "mechanical ground" within the work vehicle and thereby provide a controlled braking effect. Hydraulic clutch modules of this type may be integrated into a work vehicle to provide, for example, a park brake feature.

As conventionally produced, a hydraulic clutch module is designed for the sole performance of a single, dedicated function. Thus, a conventional hydraulic clutch module designed to function as a hydraulically-applied, spring-released rotary coupling cannot alternatively serve as a spring-applied, hydraulically-released brake. Conversely, a hydraulic clutch module designed to function as a spring-applied, hydraulically-released brake is traditionally incapable of serving as a hydraulically-applied, spring-released rotary coupling. This results in a certain lack of versatility and cross-compatibility between hydraulic clutch modules, which may contribute to an overall increase in the complexity, cost, and duration of work vehicle manufacture.

SUMMARY OF THE DISCLOSURE

Embodiments of a drive assembly, and a bimodal clutch module therefor, are provided.

In one embodiment, a bimodal clutch module includes a pressure plate, a module housing containing first and second cavities located on opposing sides of the pressure plate, and an actuator. The actuator is coupled to the module housing and controllable to move the pressure plate along a working axis. A clutch member is installed in a selected one of the first and second cavities. The clutch member is (i) engaged by movement of the pressure plate along the working axis in a first direction when the clutch member is installed in the first cavity, and (ii) disengaged by movement of the pressure plate along the working axis in the first direction when the clutch member is installed in the second cavity.

In another embodiment, a bimodal clutch module includes a module housing having a central opening, a clutch member contained within the module housing, and a clutch hub extending into the central opening and rotatable with respect to the module housing. The clutch hub includes first and second hub-clutch engagement interfaces, which are spaced along the working axis. Each hub-clutch engagement interface is sized and shaped to allow the clutch member to be matingly mounted thereto or installed therearound. A plurality of pistons is further coupled to the module housing. When stroked in a first direction along a working axis, the plurality of pistons exert a compressive force on the clutch member that (i) increases when the clutch member is mounted to the first hub-clutch engagement interface, and (ii) decreases when the clutch member is mounted to the second hub-clutch engagement interface.

Embodiments of a drive assembly for a work vehicle, such as a motor grader or a sprayer, are further provided. In one embodiment, the drive assembly includes a bimodal clutch module and an input shaft, which is coupled to the clutch module and rotatable about a working axis. The bimodal clutch module includes, in turn, a pressure plate, a module housing containing first and second cavities located on opposing sides of the pressure plate, and an actuator. The actuator is coupled to the module housing and controllable to move the pressure plate along the working axis. A clutch member is installed in a selected one of the first and second cavities. The clutch member is (i) engaged by movement of the pressure plate along the working axis in a first direction when the clutch member is installed in the first cavity and (ii) disengaged by movement of the pressure plate along the working axis in the first direction when the clutch member is installed in the second cavity.

The details of one or more embodiments are set forth in the accompanying drawings and the description below. Other features and advantages will become apparent from the description, the drawings, and the claims.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
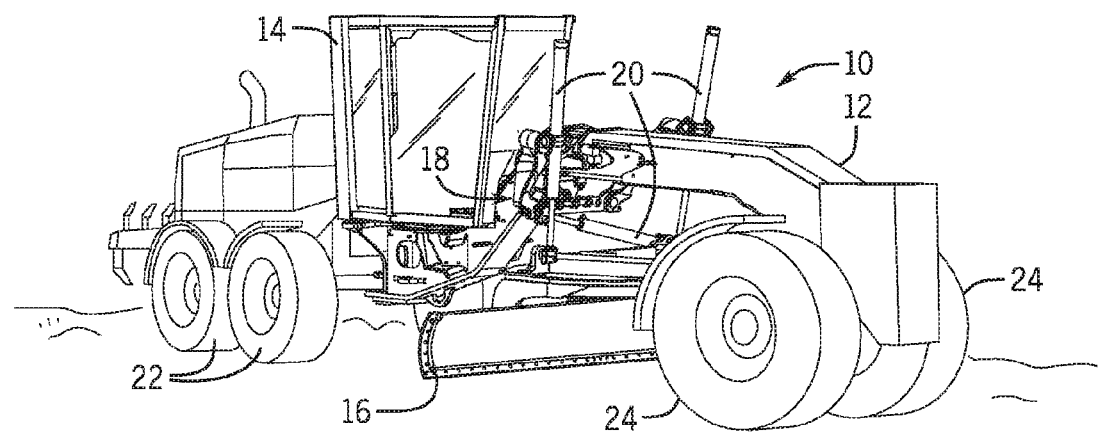
FIG. 1 is a perspective view of a work vehicle containing a number of final drive assemblies into which embodiments of a bimodal clutch module are incorporated, as illustrated in accordance with an example embodiment of the present disclosure.

The following describes one or more example embodiments of the disclosed drive assembly and clutch module, as shown in the accompanying figures of the drawings described briefly above. Various modifications to the example embodiment(s) may be contemplated by one of skill in the art.

As appearing herein, the term "bimodal" is utilized to describe a clutch module that is operable in at least two functional modes. The term "bimodal," then, does not restrict embodiments of the bimodal clutch assembly to include only two modes and, instead, encompasses clutch assemblies including more than two modes. As further appearing herein, the term "spring" refers to a resilient member or device. The term "spring" thus encompasses gas springs and mechanical springs, such as wire form and machined springs.

It certain applications it may be desirable to provide clutch modules capable of operating in at least two modes in a manner increasing the versatility and usefulness of the clutch module. Ideally, such a "bimodal" clutch module could function as either hydraulically-applied, spring-released rotary couplings or spring-applied, hydraulically-released brakes in at least some implementations. In other implementations, it would be desirable for the bimodal clutch module to perform alternative functions and/or to incorporate other types of non-hydraulic actuators, such as electrical or pneumatic actuators.

The following describes embodiments of a drive assembly have a bimodal clutch module, which can be structurally configured to function as either a spring-applied, actuator-released rotary coupling or an actuator-applied, spring-released rotary coupling. When structurally configured or manually preset to function as a spring-applied, actuator-released rotary coupling, the bimodal clutch module is referred to herein as operating in a "SAAR mode." Conversely, when structurally configured to function as an actuator-applied, spring-released rotary coupling, the clutch module is referred to herein as operating in an "AASR mode." When configured to operate in the SAAR mode and containing one or more hydraulic actuators, the bimodal clutch module may be well-suited for usage as a spring-released, hydraulically-applied brake deployed onboard a sprayer or other work vehicle. In comparison, when configured to operate in the AARS mode and containing one or more hydraulic actuators, the bimodal clutch module may be utilized as hydraulically-applied, spring-released rotary coupling onboard a motor grader or other work vehicle. Advantageously, the ability to structurally configure or manually preset the bimodal clutch module to operate in either of the above-described modes during assembly or installation of the clutch module into a particular platform or application (e.g., a work vehicle) increases the versatility and usefulness of the clutch module. This increased versatility may enable the bimodal clutch module to be utilized across multiple different platforms (e.g., work vehicles of varying types) to help reduce the overall cost, complexity, and duration of manufacture.

As indicated above, the bimodal clutch module can be structurally configured to operate in the SAAR or the AASR mode when the clutch module is installed within a work vehicle or other platform. In one embodiment, the bimodal clutch model can be structurally configured to operate in a selected mode by installing a clutch member, such as a friction-engaged clutch pack, in either of two pockets or "mode selection cavities" provided within the module housing. The mode selection cavities may be separated or partitioned by a pressure plate, which can slide within the module housing along a working axis. Movement of the pressure plate along the working axis in a first direction may be urged by a resilient bias force provided by one or more springs further contained in the module housing. An actuator, such as a hydraulically-driven piston actuator, can be controlled to move the pressure plate along the working axis in a second, opposing direction. Thus, when actuated, the actuator may overcome the resilient bias force and either compress or decompress the clutch member, depending upon the particular mode selection cavity in which the clutch member has been installed. The clutch member may consequently be engaged by sliding movement of the pressure plate along the working axis in the first direction when installed within the first mode selection cavity. Conversely, the clutch member may be disengaged by movement of the pressure plate along the working axis in a first direction when installed within the second mode selection cavity. This allows assembly personnel to determine whether the bimodal clutch module will function in either the AASR mode or the SAAR mode at the time of assembly or installation. Specifically, assembly personnel need only ensure that the clutch member is located within the appropriate mode selection cavity prior to installing the clutch module within a work vehicle (or other system, platform, or application) to determine whether the bimodal clutch module will ultimately function an AASR mode (as appropriate when the clutch module is utilized as, for example, a hydraulically-applied, spring-released rotary coupling) or the SAAR mode (as appropriate when the clutch module is utilized as, for example, a spring-applied, hydraulically-released brake).

Example embodiments of the drive assembly with a bimodal clutch module are described below in conjunction with FIGS. 2-5. To provide an example context in which embodiments of the bimodal clutch module may be better understood, the following primarily describes the example drive assembly in conjunction with a particular type of work vehicle, namely, the motor grader shown in FIG. 1. This notwithstanding, it is emphasized that embodiments of the bimodal clutch module can be utilized in conjunction with other types of work vehicles including, but not limited to, agricultural sprayers. More generally, embodiments of the bimodal clutch module are not restricted solely to usage within work vehicles and, instead, may be utilized within various other types of vehicles and non-vehicular platforms.

FIG. 1 is a perspective view of a motor grader 10, which can contain one or more drive assemblies having bimodal clutch modules (described below) and which is illustrated in accordance with an example embodiment. The motor grader 10 includes a wheeled body or main frame 12, a cabin or operator station 14, and a grader blade 16 suspended beneath the main frame 12. The grader blade 16 may be connected to the main frame 12 by a grader blade suspension linkage 18 including various combinations of structural elements (e.g., bell cranks, crossbars, swivel connectors, etc.) and actuators, such as hydraulic cylinders 20. Wheels 22, 24 are mounted to the main frame 12 and driven by a motor contained within the motor grader 10. Specifically, four drive wheels 22 (two of which can be seen in FIG. 1) are mounted to the trailing portion or "rear unit" of the motor grader 10, while two steered wheels 24 are mounted to the leading portion or "forward unit" of the motor grader 10.

During operation of the motor grader 10, the drive wheels 22 are rotated by one or more drive motors further carried by the motor grader 10. In the illustrated example, the drive wheels 22 are each driven by an electric drive motor through a final drive assembly. The final drive assemblies may each provide a mounting interface for an associated drive wheel 22, as well as a mechanical reduction between the drive wheel 22 and its corresponding electric drive motor. Additionally, a clutch module may be integrated into each final drive assemblies to allow the drive wheels 22 to be selectively disconnected from it associated drive motor to provide a controllable freewheel condition. In accordance with embodiments of the present disclosure, the drive assemblies of the motor grader 10 contain bimodal clutch modules, which have been structurally configured or manually preset during installation to function as hydraulically-applied, spring-released rotary couplings. An example of a bimodal clutch module 26 that may be contained within each of the final drive assemblies associated with the drive wheels 22 is described below in conjunction with FIG. 4. First, however, additional description of an example final drive assembly 28 is provided in conjunction with FIGS. 2-3 to further provide an illustrative context in which embodiments of the clutch module 26 may be better understood.

Figure 2:
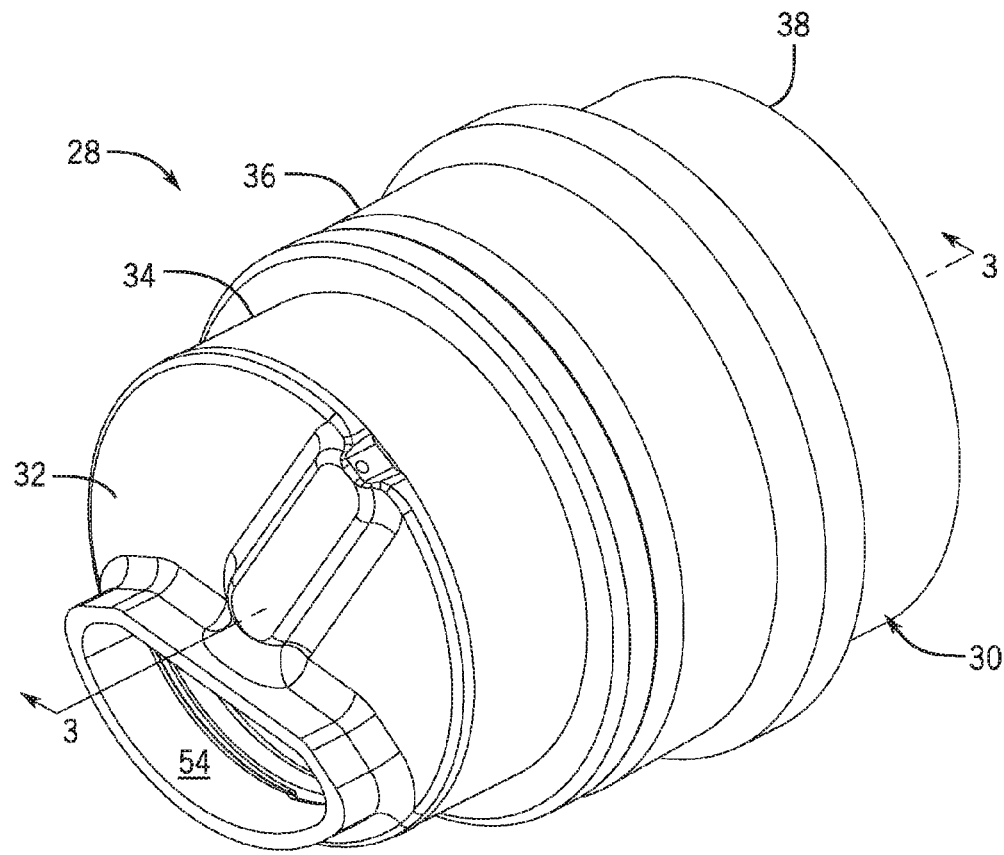
FIGS. 2 and 3 are isometric and cross-sectional views, respectively, of an example final drive assembly, which contains a bimodal clutch module and which is included in the work vehicle shown in FIG. 1.
Figure 3:
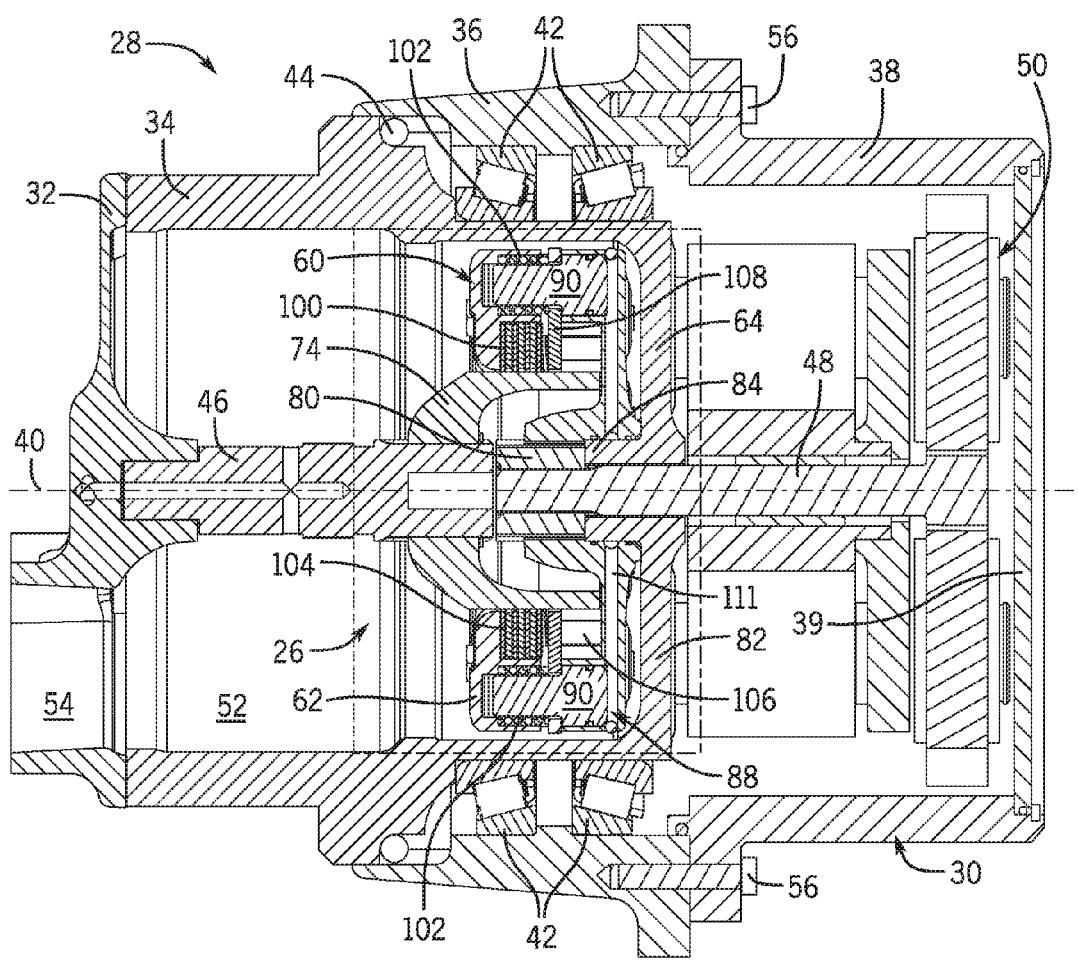

Referring now to FIGS. 2-3, the example final drive assembly 28 includes a generally tubular or cylindrical housing assembly 30 (hereafter "the final drive casing 30"). The final drive casing 30 can be produced from any number of components, which may be assembled in various different manners. In the illustrated example, the final drive casing 30 includes five major components: (i) a first end cap 32, (ii) an annular casing piece 34, (iii) an annular wheel mount 36, (iv) a gearbox housing piece 38, and (v) a second end cap 39. The end cap 32 and the annular casing piece 34 are fixedly joined to produce a first or "stator" casing portion 32, 34. So too are the annular wheel mount 36, the gearbox housing piece 38, and the end cap 39 fixedly joined (e.g., by bolts 56) to form a second or "rotor" casing portion 36, 38, 39. The rotor casing portion 36, 38, 39 is permitted to rotate relative to the stator casing portion 32,34 about a centerline or rotational axis 40 (FIG. 3) of the final drive assembly 28. The rotational axis 40 (FIG. 3) of the final drive assembly 28 corresponds to the working axis of the bimodal clutch module, as described below in conjunction with FIG. 4. As shown most clearly in FIG. 3, roller bearings 42 may be disposed between an inner circumferential surface of the annular wheel mount 36 and an outer circumferential surface of the annular casing piece 34 to facilitate relative rotation between the stator casing portion 32,34 and the rotor casing portion 36, 38, 39. If desired, a dynamic seal 44 (e.g., an O-ring) may also be positioned between annular wheel mount 36 and the annular casing piece 34 to better seal this interface from environmental contaminants, such as dust and debris.

As previously noted, and referring specifically to FIG. 3, the example final drive assembly 28 contains a bimodal clutch module 26. The bimodal clutch module 26 is coupled between an input shaft 46 and an output shaft 48 further included in the final drive assembly 28. The output shaft 48 is, in turn, is coupled to the rotor casing portion 36, 38, 39 through a double reduction planetary gear train 50. Although not shown in FIG. 3 for clarity, an electric drive motor (or other drive motor) may further be positioned within a cavity 52 provided in the first casing portion 32, 34. The electric drive motor may be powered via cables received through a lower opening 54 in end cap 32. The mechanical output of the non-illustrated electric drive motor engages the input shaft 46 such that, when properly energized, the drive motor causes input shaft 46 to rotate. Rotation of the input shaft 46 drives rotation of the output shaft 48 when the shafts 46, 48 are coupled by clutch module 26. The rotation of the output shaft 48 further drives rotation of the planetary gear train 50, the rotor casing portion 36, 38, 39, and the wheel 22 (FIG. 1) mounted to the annular wheel mount 36. Conversely, when the bimodal clutch module 26 does not transmit rotational motion between the input shaft 46 and the output shaft 48, a freewheel conditions occurs. During such a freewheel condition, forward driving of the wheel 22 (FIG. 1) mounted to the annular wheel mount 36 by the non-illustrated electric drive motor is prevented, as is back-driving of the electric drive motor by rotation of the wheel 22 and annular wheel mount 36.

In the case of the example final drive assembly 28 shown in FIGS. 2-3, the bimodal clutch module 26 functions as an actuator-applied, spring-released rotary coupling. Additionally, as the bimodal clutch module 26 contains a hydraulic actuation system or actuator (described below), the bimodal clutch module 26 specifically serves as a hydraulically-applied, spring-released rotary coupling. In further embodiments, the bimodal clutch module 26 may contain other types of actuators, such pneumatic actuators (e.g., pneumatic piston-based actuators) or electric actuators (e.g., solenoids or other electrical linear actuators), in place of the below-described hydraulic actuator. Moreover, in further embodiments, the bimodal clutch module 26 can be structurally configured or manually preset to function as a spring-applied, actuator-released rotary coupling, such as a spring-applied, hydraulically-released brake. Additional description of the bimodal clutch module 26 when structurally configured to function as spring-applied, hydraulically-released brake is provided below in conjunction with FIG. 5. Before this, however, the bimodal clutch module 26 is further described in conjunction with FIG. 4, as considered when the clutch module 26 is structurally configured to function as a hydraulically-applied, spring-released rotary coupling.

Figure 4:
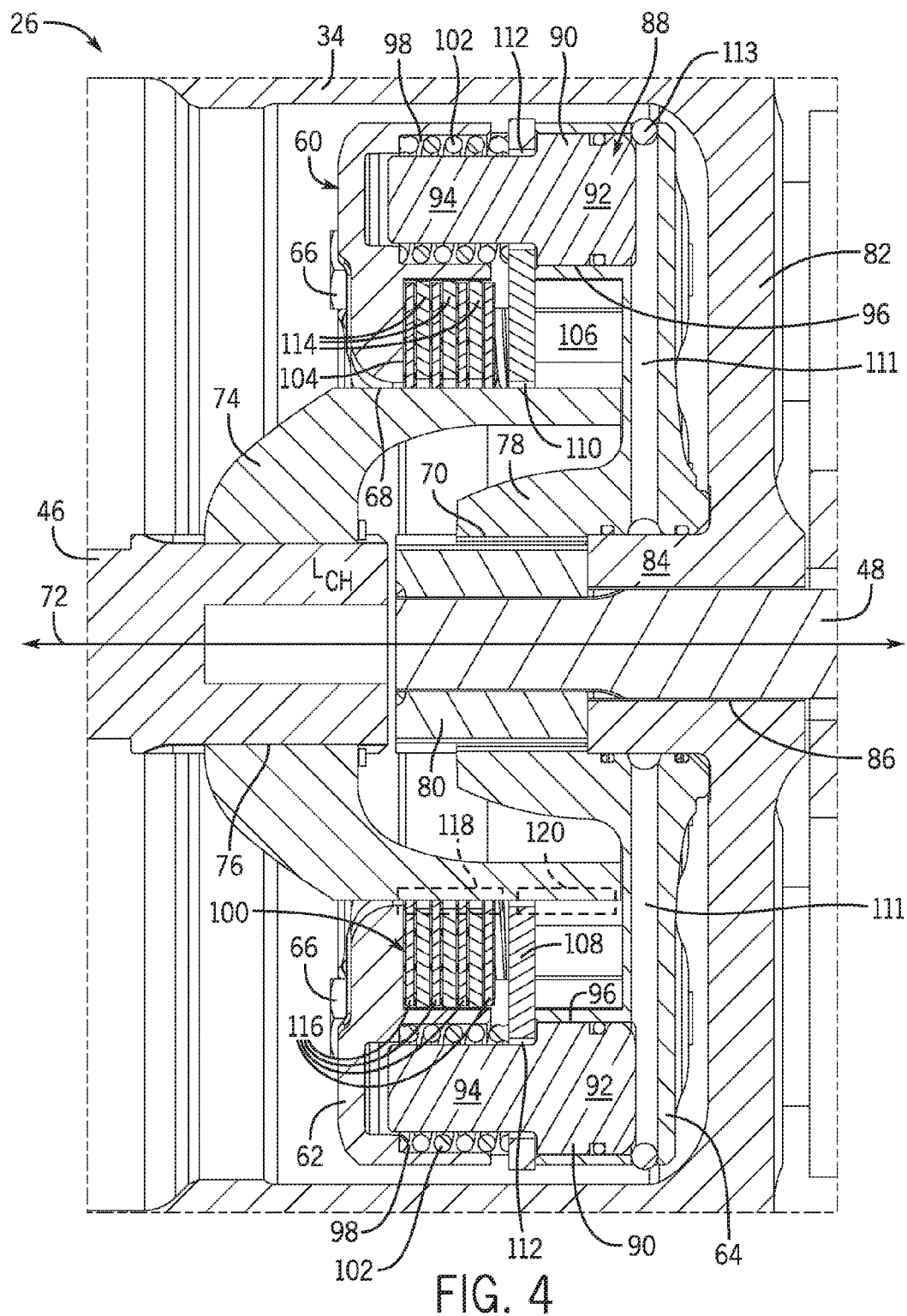
FIG. 4 is a detailed cross-sectional view of the example bimodal clutch module shown in FIG. 3 further illustrating the manner in which the clutch module has been structurally configured or manually preset to operate as a hydraulically-applied, spring-released rotary coupling.

Referring now to FIG. 4, the bimodal clutch module 26 is shown in greater detail. Here, it can be seen that the bimodal clutch module 26 includes a module housing 60, which is assembled from a module housing piece 62 and a module housing piece 64. In the illustrated example, the housing pieces 62 and 64 are joined utilizing a plurality of bolts 66 or other such fasteners; however, the components included within the module housing 60 and the manner in which those components are joined may vary amongst embodiments. The first module housing piece 62 has a substantially annular or tubular geometry, which circumferentially bounds or defines a central opening 68. The central opening 68 extends into the clutch module 26 from a first side thereof. Similarly, the second module housing piece 64 has a substantially annular or tubular geometry defining a shaft opening 70. The shaft opening 70 extends into the clutch module 26 from a second side thereof and may be coaxial with the central opening 68. The module housing 60 and, more generally, the bimodal clutch module 26 has a relatively compact, pancake-like form factor, as taken along the centerline or working axis of the clutch module 26 (represented in FIG. 4 by double-headed arrow 72). Beneficially, the axially-compact form factor of the bimodal clutch module 26 may provide space and weight savings relative to other known clutch modules having bulkier dimensions.

The bimodal clutch module 26 further includes a mechanical input and a mechanical output. The mechanical output of the bimodal clutch module 26 may or may not be permitted to rotate about the working axis 72, depending upon the manner in which the clutch module 26 is integrated into the larger work vehicle (or other platform). In the example embodiment shown in FIGS. 3-4, specifically, a central rotating piece or "clutch hub" 74 serves as the mechanical input of the bimodal clutch module 26. In this regard, the clutch hub 74 is received in the central opening 68 and is coupled to the input shaft 46 of the final drive assembly 28 (FIGS. 2-3) in a rotationally-fixed relationship. The input shaft 46 is received within a central channel 76 provided through the clutch hub 74 and rotationally fixed to an inner circumferential portion of the hub 74 utilizing, for example, a splined interface. Comparatively, the module housing piece 64 serves as the mechanical output of the bimodal clutch module 26. Specifically, the module housing piece 64 is produced to include an annular shaft interface portion 78, which is rotationally fixed to an end of the output shaft 48. An annular adapter piece 80 may be utilized to provide this connection. In this case, an outer circumferential surface of the adapter piece 80 may be splined or otherwise rotationally fixed to an inner circumferential surface of the annular shaft interface portion 78, while an inner circumferential surface of the adapter piece 80 may be splined or otherwise rotationally fixed to an outer circumferential surface of the output shaft 48.

The bimodal clutch module 26 is mounted within the final drive assembly 28 (FIGS. 2-3) for rotational about the working axis 72 of the clutch module 26. The bimodal clutch module 26 may be mounted within the annular casing piece 34 of the final drive casing 30 and located adjacent a radial wall 82 provided therein. A tubular extension 84 projects axially from the radial wall 82 toward the bimodal clutch module 26. The bimodal clutch module 26 is fit onto or otherwise mounted to the tubular extension 84 such that clutch module 26 circumscribes and can rotate about the extension 84. The annular shaft interface portion 78 of the module housing piece 64 matingly engages the tubular extension 84 to mount the bimodal clutch module 26 within the final drive assembly 28 (FIGS. 2-3). A longitudinal channel 86 further extends through tubular extension 84 to permit the passage of the output shaft 48 and thereby allow the rotationally-fixed coupling between the annular shaft interface portion 78 and the terminal end of the shaft 48 in the manner previously described. The clutch hub 74 includes a cavity accommodating the rotationally-fixed coupling between the annular shaft interface portion 78 and the terminal end of the shaft 48. The rotationally-fixed coupling between the annular shaft interface portion 78 and the terminal end of the shaft 48 is thus nested within the clutch hub 74, which circumscribes or extends around the interface portion 78.

The bimodal clutch module 26 further includes an actuation system 88. In the illustrated example, the actuation system 88 assumes the form of a hydraulic piston actuation system and is referred to hereafter as "hydraulic actuator 88." In further embodiments, the actuation system can assume other forms, whether hydraulic, pneumatic, or electrical in design, or a combination thereof. Additionally, in certain embodiments, the actuator or actuation system may be externally located with respect to the module housing 60. In the embodiment shown in FIG. 4, hydraulic actuator 88 includes an annular array of pistons 90, which are angularly spaced about the working axis 72 of the bimodal clutch module 26. In one implementation, the bimodal clutch module 26 may include four pistons 90 angularly spaced about the working axis 72 at regular intervals of 90 degrees (°). In other implementations, the bimodal clutch module 26 can include a different number of pistons angularly spaced about the working axis 72 at regular or irregular intervals. The pistons 90 each include a piston head end 92 and a rod end 94. The piston head end 92 of each piston 90 is received within a mating opening or bore 96 provided in the module housing piece 64, while the rod end 94 of each piston 90 is received within an aligning opening or bore 98 provided in the module housing piece 62. The pistons 90 thus each extend within the module housing 60 from one of the housing pieces 62, 64 to the other of the housing pieces 62, 64. As will be described below, the pistons 90 slide or stroke within the module housing 60 along axes parallel to the working axis 72 of the bimodal clutch module 26 when the hydraulic actuator 88 is actuated by supplying sufficiently-pressurized hydraulic fluid thereto.

A clutch member 100 is further disposed within the module housing 60 and contained within a first mode selection cavity 104. In other instances, the clutch member 100 can be positioned within a second mode selection cavity 106. As will be explained in detail below, the mode selection cavity 104, 106 in which the clutch member 100 is installed determines the mode in which the bimodal clutch module 26 operates. The mode selection cavities 104, 106 are partitioned or separated by a pressure plate 108, as taking along the working axis 72 of the bimodal clutch module 26. The term "pressure plate," as appearing herein, refers to a body or structural element through which pressure is selectively applied to a clutch member, such as clutch member 100, and regardless of the geometry of the pressure plate. Thus, while the pressure plate 108 can and often will have a relatively thin, plate-like geometry in embodiments, this need not always be the case.

With continued reference to FIG. 4, the first mode selection cavity 104 is defined by the module housing piece 62, the clutch hub 74, and the pressure plate 108. An inner annular shelf or ledge is provided in the interior of the housing piece 62, which bounds the first mode selection cavity 104 in an axial direction and in a radial direction. An outer circumferential surface of the clutch hub 74 further bounds the interior of the mode selection cavity 104 in a second radial direction. Finally, a radial face of the pressure plate 108 bounds the mode selection cavity 104 in a second axial direction. The second mode selection cavity 106 is similarly defined by the module housing piece 64, the clutch hub 74, and the pressure plate 108. An inner annular shelf or ledge is provided within the interior of the module housing piece 64, which bounds the second mode selection cavity 106 in an axial direction and in a radial direction. An outer circumferential surface of the clutch hub 74 again bounds the interior of the second mode selection cavity 106 in a second radial direction, while the opposing radial face of the pressure plate 108 bounds the mode selection cavity 104 in a second axial direction. The mode selection cavities 104 and 106 thus each extend around or circumscribe the clutch hub 74. As a result of this structural configuration, the clutch member 100 can readily be interchanged or "swapped" between the mode selection cavities 104, 106 to determine the operational mode of the bimodal clutch module 26. The mode selection cavities 104, 106 may have substantially matching geometries and shapes to each allow the clutch member 100 to be selectively received therein. Thus, the mode selection cavities 104, 106 may be substantially mirror opposites taken along a plane of symmetry extending through the pressure plate 108. As indicated in FIG. 4, the mode selection cavity 104 not occupied by the clutch member 100 may be left empty or unfilled.

As does the clutch member 100, the pressure plate 108 extends around or circumscribes the clutch hub 74. The pressure plate 108 includes a central opening 110 through which the clutch hub 74 extends. The pressure plate 108 is thus captured between the first and second module housing pieces 62, 64 of the module housing 60, while permitted to slide along the clutch hub 74. The pressure plate 108 may slide along the clutch hub 74 and, therefore, move along the working axis 72 in conjunction with the stroke position of the pistons 90. The pressure plate 108 may be mechanically linked to movement of the pistons 90 (or other actuator movement) in various different manners. In the illustrated example, piston openings 112 are provided in pressure plate 108 through the pistons 90 are received. In particular, the rod ends 94 of the pistons 90 extend through the piston openings 112, while the piston head ends of the pistons 90 seat against or abut the pressure plate 108. Accordingly, when stroked in a first direction along the working axis 72 (to the left in FIG. 4; referred to hereafter as the "actuation direction"), the pistons 90 will urge sliding movement of the pressure plate 108 in the actuation direction to exert a controlled compressive force against the clutch member 100 when positioned within the first mode selection cavity 104. In the illustrated example, the mode selection cavities 104, 106 are located radially inboard of the annular array of the pistons 90. However, in further embodiments, the mode selection cavities 104, 106 may be located radially outboard of the pistons 90.

Hydraulic channels 111 are formed in the module housing piece 64 and allow the supply of pressurized hydraulic fluid to the piston head ends 92 of the pistons 90 from a non-illustrated pressurized fluid source. When sufficiently-pressurized hydraulic fluid is directed against the piston head ends 92, the pistons 90 stroke in the actuation direction along the working axis 72 (to the left in FIG. 4) and exert a compressive force on the clutch member 100. Movement of the pistons 90 in the actuation direction is resisted by an annular array of compression springs 102, which are further disposed within the bimodal clutch module 26 (only two of which can be seen). The springs 102 may be disposed within the openings or bores 98 provided within the module housing piece 62 and circumscribe the rod ends 94 of the pistons 90. A first end of each spring 102 may contact a spring seat provided in the module housing piece 62, while a second opposing end of each spring 102 may contact the pressure plate 108 substantially opposite the piston head end 92 of one of the pistons 90.

Compressed between the module housing piece 62 and the pressure plate 108, the springs 102 exert a resilient bias force on the pressure plate 108 in a return direction (hereafter the "return direction") along the working axis 72 (to the right in FIG. 4). Accordingly, the pistons 90 stroke in the actuation direction (to the left in FIG. 4) only when the cumulative force applied to the piston head ends 92 by the hydraulic fluid surpasses the cumulative resilient bias force exerted on the pressure plate 108 by the springs 102 in the return direction (to the right in FIG. 4). Furthermore, after the pistons 90 are stroked in the actuation direction and the "high side" pressure is no longer supplied to the piston head ends 92, the resilient bias force exerted by the springs 102 serves to return the pistons 90 to their initial resting positions shown in FIG. 4. The pistons 90 may thus be referred to as "spring biased pistons," as may any piston or pistons that are directly or directly acted upon by a spring bias force urging sliding movement of the pistons in a particular direction. A O-ring or gasket 111 may further be provided around the hydraulic channels 113 to reduce the likelihood of hydraulic fluid leakage and to provide a soft stop feature, which is engaged by the pistons 90 when returning to the default or non-actuated position shown in FIG. 4.

The pressure plate 108 normally remains in the position shown in FIG. 4 due to the resilient bias force of the springs 102. In this position, the pressure plate 108 applies little to no compressive force on the clutch member 100 such that the clutch member 100 resides in a disengaged state and does not rotationally fix the clutch hub 74 to the module housing 60. Thus, in the non-actuated position shown in FIG. 4, the clutch hub 74 (and, therefore, the input shaft 46) can freely rotate relative to the other portions of the bimodal clutch module 26 (and, therefore, relative to the output shaft 48). When the hydraulic actuator 88 is actuated, the pistons 90 urge sliding movement of the pressure plate 108 in the actuation direction (to the left in FIG. 4). The pressure plate 108 contacts the clutch member 100 and exerts a sufficient compressive force thereon to cause the clutch member 100 to engage. When engaged, the clutch member 100 places the clutch hub 74 and the module housing 60 a rotationally-fixed relationship. Rotary motion is thus transmitted from input shaft 46, through the clutch hub 74, through the module housing 60, through the adapter piece 80, and to the output shaft 48. In certain instances, back-driving may occur through the bimodal clutch module 26 such that this transmission of rotary motion set-out above is reversed.

As a point of emphasis, the clutch member 100 can be any structural element, assembly or grouping of structural elements, or device capable of selectively placing two structural elements in a rotationally-fixed relationship when the clutch member 100 is compressed or otherwise acted upon by an actuator. Devices suitable for usage as the clutch member 100 include, but are not limited to, frictional clutches and non-slip clutches, such as dog clutches. In the illustrated embodiment, and by way of non-limiting example only, the clutch member 100 is a friction-type clutch pack including a number of separator plates 114 and friction disks 116, which are interleaved or interspersed in an alternating relationship. In certain implementations, the separator plates 114 may be affixed to the module housing piece 62, while the friction disks 116 are affixed to the clutch hub 74. In other implementations, the separator plates 114 may be affixed to the clutch hub 74, while the friction disks 116 are affixed to the module housing piece 62. In the absence of a compressive force exerted across the clutch member 100, the separator plates 114 and the friction disks 116 are able to rotate freely relative to each other about the working axis 72. When a sufficient compressive is exerted across the clutch member 100, the separator plates 114 and the friction disks 116 frictionally engage to form the desired rotational coupling between the clutch hub 74 and the module housing piece 62.

The outer circumferential region of the clutch hub 74 engaged by the clutch member 100 when installed the first mode selection cavity 104 is identified in FIG. 4 by reference numeral "118" and is referred to herein as a first "hub-clutch engagement interface." Similarly, the outer circumferential region of the clutch hub 74 engaged by the clutch member 100 when installed the second mode selection cavity 104 is identified by reference numeral "120" and is referred to herein as a second "hub-clutch engagement interface." The first and second hub-clutch engagement interfaces 118,120 are axially spaced along the working axis 72. To accommodate hub-clutch engagement interfaces 118, 120, and to provide sufficient space in which to nest the shaft interface portion 78 to which the output shaft 48 is coupled, the clutch hub 74 is produced to have an axially-elongated geometry, as taken along the working axis 72. The length of the clutch hub 74 is identified in FIG. 4 by double-headed arrow LCH. In one embodiment, and by way of non-limiting example only, the clutch hub 74 may have a length (LCH) greater than one half the length of the bimodal clutch module 26, as considered as a whole and taken along the working axis 72.

The foregoing has thus described the example bimodal clutch module 26 when operating in a first mode (referred to above as the "spring-released, actuator-applied mode" or the "AASR mode"). In the above-described example embodiment, the bimodal clutch module 26 is utilized as a spring-released, hydraulically-applied rotary coupling onboard a work vehicle, such as motor grader 10 shown in FIG. 1. Accordingly, the bimodal clutch module 26 was structurally configured or manually preset to operate in the AASR mode by installation of the clutch member 100 within the first mode selection cavity 104. In further embodiments, assembly personnel can structurally configure the bimodal clutch module 26 to operate in a second mode (referred to have as the "spring-applied, actuator-release mode" or the "SAAR mode") by relocating the clutch member 100 into the second mode selective cavity 106. Further description of the bimodal clutch module 26 when structurally configured to operate in the SAAR mode will now be described in conjunction with FIG. 5.

Figure 5:
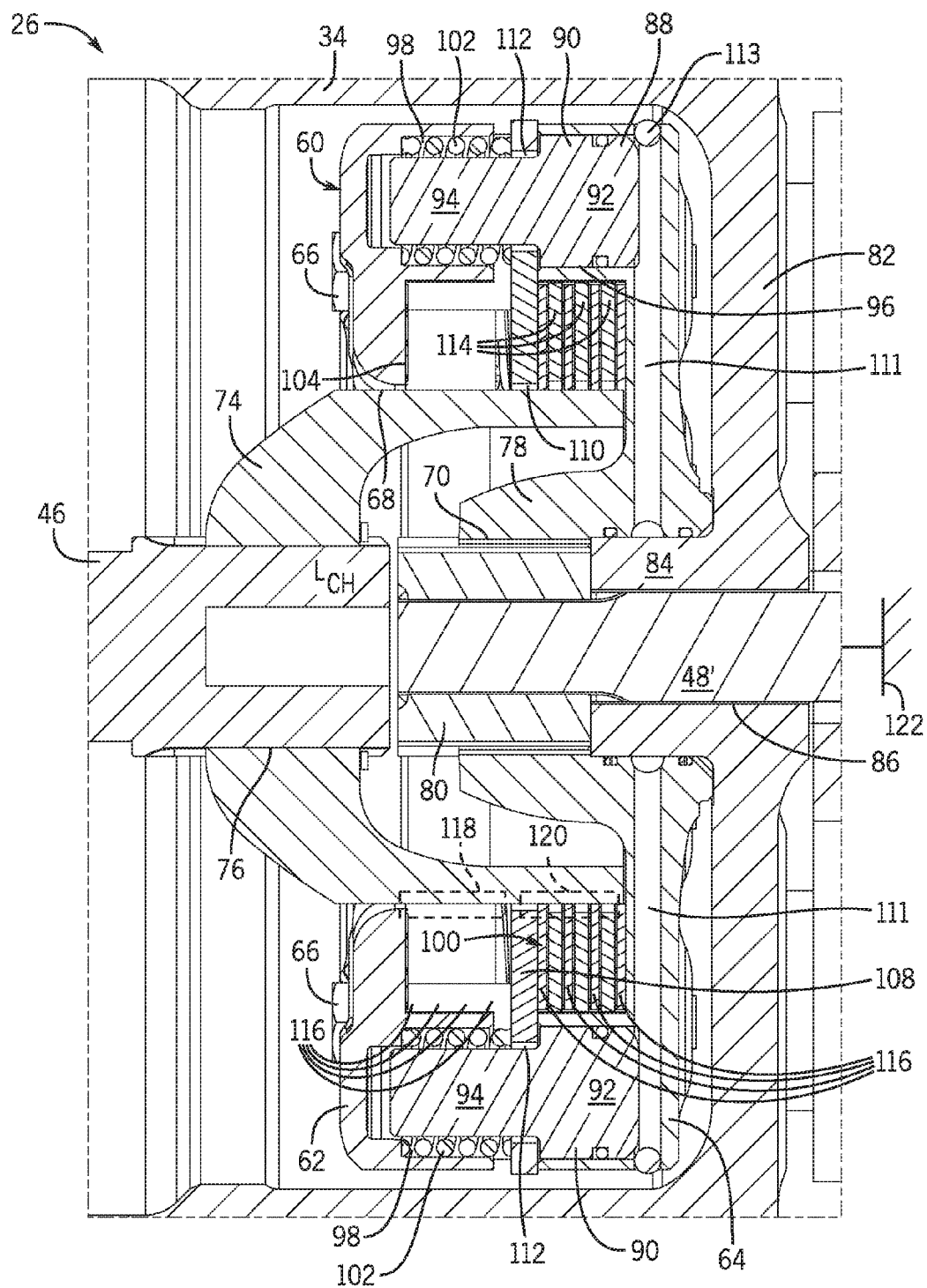
FIG. 5 is a detailed cross-sectional view of the example bimodal clutch module shown in FIGS. 3-4, as illustrated when the clutch module has been structurally configured or manually preset to operate as a spring-applied, hydraulically-released brake.

With reference to FIG. 5, the bimodal clutch module 26 is further illustrated in a second implementation wherein the clutch member 100 is installed within the second mode selection cavity 106. By virtue of the installation of the clutch member 100 in the second mode selection cavity 106, the bimodal clutch module 26 has now been structurally configured or manually preset to operate in the SAAR mode. When operating in this mode, and when containing hydraulic actuators, the bimodal clutch module 26 is well-suited for usage as a spring-applied, hydraulically-released brake, such as a spring-applied, hydraulically-released park brake deployed onboard a sprayer or other work vehicle. In this case, the mechanical output of the bimodal clutch module 26 may be fixedly coupled to a static structure or a mechanical ground, as indicated in FIG. 5 by symbol 122. Specifically, rotation of the output shaft 48' is prevented in FIG. 5 such that output shaft 48' is a rotationally-fixed, static structural element (the addition of the prime symbol denoting this difference). Consequently, the mechanical output of the bimodal clutch module 26 (module housing piece 64 of module housing 60) cannot rotate and may be considered "mechanically grounded." Aside from the positioning of the clutch member 100 in the second mode selection cavity 106, the disposition and function of the other structural elements of the bimodal clutch module 26 remains essentially identical to that described above in conjunction with FIG. 4.

Now installed within the second mode selection cavity 106, the clutch member 100 is normally compressed by the resilient bias force of the springs 102 as exerted on the clutch member 100 through the pressure plate 108. The clutch member 100 is consequently engaged in the default or non-actuated state of the bimodal clutch module 26, as illustrated in FIG. 5. When engaged, the clutch member 100 rotationally couples the clutch hub 74 (specifically, the second hub-clutch engagement interface 120) to the module housing piece 64. In embodiments wherein the output shaft 48' is free to rotate, rotational motion is thus transmitted from the input shaft 46, through the module housing piece 64, including the annular shaft interface portion 78, through the adapter piece 80, and to the output shaft 48'. However, in the illustrated example wherein the output shaft 48' is grounded, rotation of the input shaft 46 is arrested (or at least impeded) when the clutch member 100 is engaged and the bimodal clutch module 26 resides in a default or non-actuated state. When hydraulic actuator 88 is actuated, the pistons 90 stroke in the actuation direction along the working axis 72 (to the left in FIG. 5), the pressure plate 108 moves in the actuation direction (to the left), and the compressive force applied to the clutch member 100 is removed or at least lessened to a level sufficient to disengage the clutch member 100. The bimodal clutch module 26 is thus placed in an "actuated" or "non-coupling" state wherein the clutch hub 74 can freely rotate with respect to the module housing piece 64 and the other components of the clutch module 26. In the illustrated example wherein the output shaft 48' is grounded and the bimodal clutch module 26 is utilized as a spring-applied, hydraulically-released brake, the bimodal clutch module 26 thus removes or at least lessens the braking force previously preventing rotation of the input shaft 46.

There has thus been provided example embodiments of a drive assembly with a bimodal clutch module, which is capable of operating in at least two modes. In embodiments wherein the bimodal clutch module contains a hydraulic actuator, specifically, the bimodal clutch module may structurally configured or manually preset to operate as either spring-applied, hydraulically-released brake or a hydraulically-applied, spring-released rotary coupling. Embodiments of the bimodal clutch module are well-suited for usage within motor graders, sprayers, and other work vehicles, but may also be utilized within other types of vehicular and non-vehicular platforms or applications. The ability to structurally configure or manually preset the bimodal clutch module to operate in at least two modes during installation of the clutch module increases the usefulness and versatility of the clutch module. This, in turn, may allow a reduction in the overall cost, complexity, and duration of the manufacturing processes utilized to produce work vehicles (and other platforms) into which the bimodal clutch module is integrated.

While at least one example embodiment has been presented in the foregoing description, it should be appreciated that a number of variations exist. It should also be appreciated that the example embodiment or example embodiments are only examples, and are not intended to limit the scope, applicability, or configuration of the invention in any way. Rather, the foregoing description will provide those skilled in the art with a convenient road map for work implementing an example embodiment of the invention. It being understood that various changes may be made in the function and arrangement of elements described in an example embodiment without departing from the scope of the invention as set-forth in the appended claims.

What is claimed is:

1. A bimodal clutch module for a drive assembly of a work vehicle, comprising:
   a pressure plate;
   a module housing containing first and second cavities located on opposing sides of the pressure plate;
   an actuator coupled to the module housing and controllable to move the pressure plate along a working axis; and
   a clutch member installed in a selected one of the first and second cavities, the clutch member (i) engaged by movement of the pressure plate along the working axis in a first direction when the clutch member is installed in the first cavity and (ii) disengaged by movement of the pressure plate along the working axis in the first direction when the clutch member is installed in the second cavity;
   wherein the pressure plate, the module housing and the actuator are the same when the clutch member is installed in the first cavity as when installed in the second cavity.

2. The clutch module of claim 1, further comprising a clutch hub coupled to the clutch member, the clutch hub rotationally-fixed to the module housing by the clutch member when engaged by movement of the pressure plate along the working axis.

3. The clutch module of claim 2, wherein the first and second cavities circumscribe the clutch hub.

4. The clutch module of claim 2, wherein the clutch hub comprises:
   a first hub-clutch engagement interface engaged by the clutch member when installed within the first cavity; and
   a second hub-clutch engagement interface engaged by the clutch member when installed within the second cavity.

5. The clutch module of claim 2, wherein the module housing comprises a central opening in which the clutch hub is received.

6. The clutch module of claim 2, wherein the clutch member and the pressure plate each circumscribe the clutch hub.

7. The clutch module of claim 2, wherein the module housing and the clutch hub are each rotatable about the working axis when the clutch member is installed in the first cavity.

8. The clutch module of claim 1, wherein the pressure plate is spring biased in the first direction, and wherein the actuator, when actuated, slides the pressure plate along the working axis in a second opposing direction.

9. The clutch module of claim 1, wherein the actuator comprises spring-biased pistons coupled to the pressure plate, slidable along axes parallel to the working axis, and biased in the first direction.

10. The clutch module of claim 9, wherein the spring-biased pistons are arranged in an annular array angularly spaced about the working axis.

11. The clutch module of claim 10, wherein the first and second cavities are located radially inboard or radially outboard of the annular array of spring-biased pistons.

12. The clutch module of claim 9, wherein the module housing comprises:
   a first module housing piece partially defining the first cavity; and
   a second module housing piece fixedly coupled to the first module housing piece and partially defining the second cavity.

13. The clutch module of claim 12, wherein the pressure plate is slidably captured between the first and second module housing pieces, and wherein the spring-biased pistons each extend from the second module housing piece, through the pressure plate, and into the first module housing piece.

14. The clutch module of claim 13, further comprising hydraulic channels formed in the second module housing piece and fluidly coupled to the spring-biased pistons.

15. A bimodal clutch module for a drive assembly of a work vehicle, comprising:
   a module housing having a central opening;
   a clutch member contained within the module housing;
   a clutch hub extending into the central opening and rotatable with respect to the module housing, the clutch hub including first and second hub-clutch engagement interfaces spaced along a working axis, each hub-clutch engagement interface sized and shaped to allow the clutch member to be matingly mounted thereto; and
   a plurality of pistons coupled to the module housing and, when stroked in a first direction along the working axis, exerting a compressive force on the clutch member that (i) increases when the clutch member is mounted to the first hub-clutch engagement interface and (ii) decreases when the clutch member is mounted to the second hub-clutch engagement interface;
   wherein the module housing, the clutch hub and the plurality of pistons are the same when the clutch member is mounted to the first hub-clutch engagement interface as when mounted to the second hub-clutch engagement interface.

16. The clutch module of claim 15, wherein the clutch member rotationally connects the clutch hub to the module housing in response to the increasing compressive force exerted on the clutch hub by the plurality of pistons when the clutch member is mounted to the first hub-clutch engagement interface, and wherein the clutch member rotationally disconnects the clutch hub from the module housing in response to the decreasing compressive force exerted on the clutch hub by the plurality of pistons when the clutch member is mounted to the second hub-clutch engagement interface.

17. A drive assembly for a work vehicle, comprising:
   a bimodal clutch module, including:
      a pressure plate;
      a module housing containing first and second cavities located on opposing sides of the pressure plate;
      an actuator coupled to the module housing and controllable to move the pressure plate along a working axis of the bimodal clutch module; and
      a clutch member installed in a selected one of the first and second cavities, the clutch member (i) engaged by movement of the pressure plate along the working axis in a first direction when the clutch member is installed in the first cavity and (ii) disengaged by movement of the pressure plate along the working axis in the first direction when the clutch member is installed in the second cavity, the pressure plate, the module housing and the actuator being the same when the clutch member is installed in the first cavity as when installed in the second cavity; and
   an input shaft rotatable about the working axis and coupled to the bimodal clutch module.

18. The drive assembly of claim 17, wherein the bimodal clutch module further comprises a clutch hub coupled between the input shaft and the clutch member.

19. The drive assembly of claim 18, further comprising an output shaft coupled to the module housing in a rotationally-fixed relationship, the bimodal clutch module providing a rotationally-fixed coupling between the input shaft and the clutch hub when the clutch member is engaged to transmit rotary motion of the input shaft to the output shaft.

20. The drive assembly of claim 18, wherein the bimodal clutch module further comprises a grounded mechanical output coupled to the module housing in a rotationally-fixed relationship, the clutch member providing a rotationally-fixed coupling between the input shaft and the clutch hub when the clutch member is engaged to impede or arrest rotary motion of the input shaft.

* * * * *

UNITED STATES PATENT AND TRADEMARK OFFICE
CERTIFICATE OF CORRECTION

PATENT NO. : 10,006,498 B2
APPLICATION NO. : 15/009369
DATED : June 26, 2018
INVENTOR(S) : Steven R. Fliearman, Randall L. Long and George W. Detrick, III Page 1 of 1

It is certified that error appears in the above-identified patent and that said Letters Patent is hereby corrected as shown below:

On the Title Page

Item (72), after "Randall L . Long, Coffeyville KS (US);" delete "William G . Detrick, Coffeyville, KS (US)" and insert --George W. Detrick III, Coffeyville, KS (US)--.

Signed and Sealed this
Eleventh Day of October, 2022

Katherine Kelly Vidal
*Director of the United States Patent and Trademark Office*